April 18, 1967 P. D. SHAFFER ETAL 3,314,774
METHOD OF BENDING AND ANNEALING GLASS SHEETS
Filed March 17, 1966
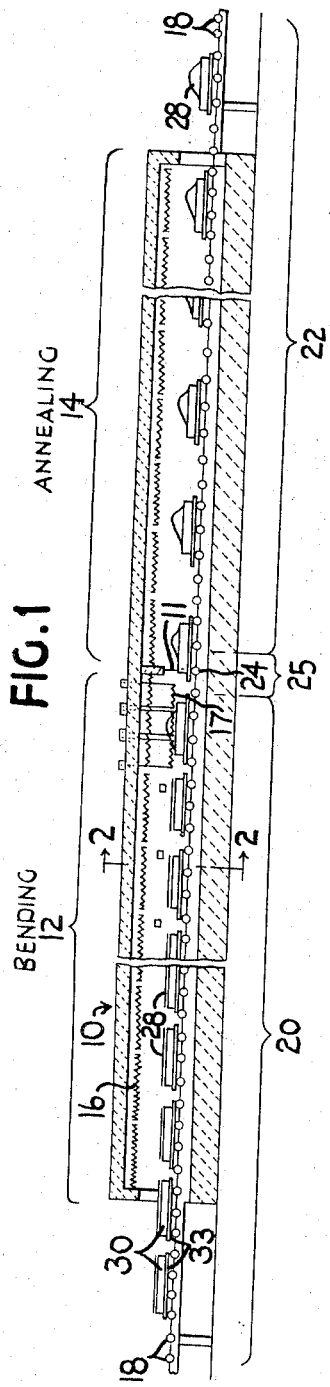
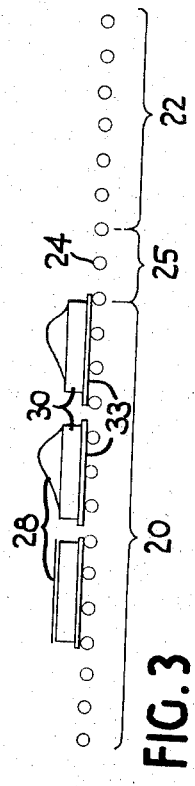
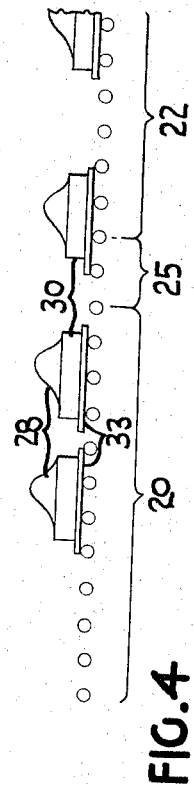
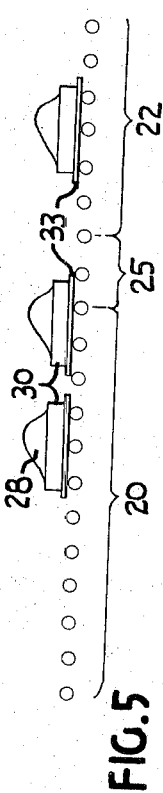
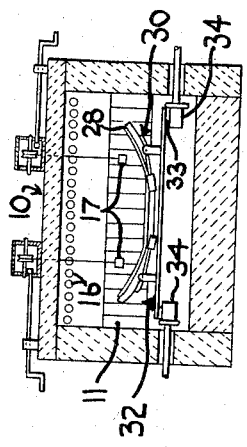
INVENTORS
PAUL D. SHAFFER
RICHARD W. GASKEY
Christolm + Spencer
ATTORNEYS ns
3,314,774
METHOD OF BENDING AND ANNEALING GLASS SHEETS
Paul D. Shaffer, New Kensington, and Richard W. Gaskey, Greensburg, Pa., assignors to Pittsburgh Plate Glass Company, Pittsburgh, Pa., a corporation of Pennsylvania
Filed Mar. 17, 1966, Ser. No. 535,104
4 Claims. (Cl. 65—104)

This application is a continuation-in-part of copending application Ser. No. 255,062 of Paul D. Shaffer, filed Jan. 30, 1963, now abandoned.

This invention relates to a method for bending glass sheets to conform to the shape of an outline mold and annealing the bent sheets. More specifically, the invention is directed to a method for improving the physical characteristics along the longitudinal side portions of the peripheral edge of glass sheets while bending and annealing glass sheets by a mass production technique involving heat sagging the glass into conformity with a mold shaping surface formed at the upper edges of the sections of a sectionalized, outline shaping rail.

In present commercial production of laminated windshields, glass sheets are mounted in pairs on molds spread for bending. The molds are conveyed transversely through a tunnel-like bending lehr having different temperature zones. The first of these zones is a preheat zone wherein the temperature of the glass is raised to substantially its softening point. Beyond this zone is a bending zone wherein the glass is further heated with especially intense heat applied to the regions to be bent most sharply. The additional heat supplied in the bending zone heat-softens the glass, thus reducing the force, due to the mass of the rigid glass sheet, opposing the tendency of the mold sections to move into the closed mold position. Movement of the mold sections into the closed mold position helps the glass to conform to the shaping surface of the upper edges of the mold rail sections. The preheat zone and bending zone provide a hot atmosphere needed to conform the glass sheets to the mold shaping surface.

The bent glass sheets are then annealed by controlled cooling as they are conveyed through an annealing zone having successive regions of controlled temperature including a portion of said zone maintained at a series of temperatures ranging successively from the upper limit to the lower limit of the annealing range of temperature for glass. The temperature of each successive region in the annealing zone traversed by the bent glass sheets is lower than that of its preceding region in the annealing zone. The annealing and cooling zone is referred to in the claims as a controlled temperature atmosphere.

It is well know in glass technology that non-uniformly cooling a body of glass which has been heated to its softening temperature causes the glass to assume a physical condition in which portions or regions thereof are in tension and other regions are in compression. Additionally, it is recognized that the regions of the glass body which cool more rapidly through the annealing range than other regions become permanently stressed in compression. On the other hand, regions of the glass simultaneously cooled more slowly through the annealing range of temperatures become permanently stressed in tension.

U.S. Patent No. 2,869,287 to William P. Bamford teaches that cooling a bent glass sheet through the annealing range of glass while maintaining contact between an outline mold and the sheet around the entire periphery but inwardly of the outer edges of the sheet develops a marginal compression stress in the sheet. However, prior to the present invention, this marginal compression stress was not sufficiently large along the longitudinal side edges of the sheet to avoid a substantial amount of breakage therealong during subsequent handling of the bent sheet.

Suitable means are known and available to the art for making an accurate determination of the tension and compression characteristics (that is, stress and strain) of a particular body of glass.

The particular means used in conjunction with this invention for measuring optical stresses, both tensile and compressive, involve placing the sheets of bent and annealed glass between a polarized light source and a graduated quartz wedge. The quartz wedge is calibrated in millimicrons. The polarized light passes through the thickness dimension of the sheets to be measured and the quartz wedge. A trained observer viewing directly into the quartz wedge will see a distinctive band which delineates and defines the maximum polar light deviation caused by the particular type of stress being observed. The graduations on the quartz wedge permit a direct reading of the magnitude of the strain in millimicrons per glass thickness or the maximum deviation of a beam of polarized light from the path it would take through the thickness of the glass if the glass were unstressed.

The locality of the sheets which is to be measured is selected by scanning the general area to find the locality of maximum stress. The stress of the selected locality is then measured by looking through the quartz wedge directly into that locality.

The compressive stress of the peripheral margin of the sheets is measured by looking at the surface of the sheets directly at their edge, i.e., the compressive stress zone. Similarly, the tensile stress of the peripheral margin of the sheets is measured from ½ to 1¼ inches inwardly from the edge of the sheets, i.e., the tensile stress zone.

By virtue of the graduations of the quartz wedge, the measured values are in terms of millimicrons per glass thickness. The optical strain rating, adjusted to millimicrons per inch by dividing the quartz wedge reading in millimicrons by the glass thickness in inches, may be converted to pounds per square inch stress units by multiplying by the stress optical coefficient. The stress optical coefficient will vary for different glass compositions. For commercial plate glass, the conversion factor is 2.13 pounds per square inch stress for each millimicron per inch of strain.

Glass, and in particular the peripheral edge of glass sheet, has been found to exhibit a greater ability to withstand the normal stresses of handling and installation when the regions subject to the greatest stress are in compression rather than tension. Thus, for example, it has become desirable in the formation of wrap-around automobile windshields to be able to improve the inherent residual stress characteristics of the edge of the glass sheets by increasing the compressive stress at the edge, thus giving a greater resistance to breaking or chipping along the edge during handling and installation. At the same time, since glass is weak when stressed in tension, it is also desirable to limit the maximum tension stress in the glass. Obviously, it would also be advantageous to be able to accomplish the above while using conventional bending equipment.

Accordingly, the primary object of this invention is to provide a method for bending and annealing glass sheets to conform to the shape of an outline mold while simultaneously controlling and improving the permanent compressive stress along the longitudinal side portions of the peripheral edge of the bent sheets and the corresponding permanent tension stress within said sheets.

An ancillary object of this invention is to provide an improved method for bending glass sheets without requiring an extensive change or modification of conventional bending apparatus.

According to the present invention, a plurality of glass laden molds are sequentially transported along the path of a continuous conveyor operating within a heated tunnel-type bending lehr. The lehr is divided in a conventional manner into a bending zone and an annealing and cooling zone with separate temperature controls for each zone. Moreover, each zone is suitably equipped with heat generating apparatus. Although the lehr conveyor is in fact a continuous conveyor, it is capable of being sub-divided into a succession of individual conveyor sections each having a receiving end and a discharge end and with each section being separately powered by a suitable variable speed drive means.

For the purpose of this invention, the lehr conveyor is operated in two independent sections disposed in end-to-end relation, with one section conveying the glass laden molds through the bending zone and the other section, immediately thereafter, conveying said molds through the annealing and cooling zone. The method of this invention may be practiced by operating the independent conveyor sections at different speeds such that the separation between successive glass-laden molds in the annealing and cooling zone is greater than the relative separation between said molds in the bending zone.

In the practice of the present invention, a succession of outline molds with glass sheets supported thereon for bending and annealing are sequentially transported along the path of the continuous conveyor. The conveyor is operated within the heated tunnel-type bending. The lehr as aforesaid, is divided into a bending zone providing a hot atmosphere maintained at a temperature above the annealing range of glass for the purpose of heat sagging the glass sheets into conformity with the upper shaping surface of said molds with their marginal edges exposed, and an annealing and cooling zone providing a controlled temperature atmosphere cooler than said hot atmosphere including a range of temperatures extending through the annealing range of glass wherein a stress pattern is established in the bent glass sheets as the latter cool through the annealing range of glass. Generally, the practices outlined above are known in the prior art. The contribution which the present invention makes to the prior art is encompassed in a mode of operation whereby the glass-laden molds are successively conveyed in relatively closely-spaced relation to one another through the bending zone, and are then conveyed through the annealing and cooling zone at a greater separation between successive molds than existed in the bending zone, and, thereafter, the bent, annealed glass is removed from the molds and the molds are rapidly returned to the bending zone for the beginning of another cycle.

It was noted that the practice of the present invention resulted in improving the residual stress characteristics along the longitudinal side portions of the peripheral edge of the bent sheets as a result of the increased spacing between molds in the annealing and cooling zone. This is directly attributable to the fact that closely spaced molds, if present in closely spaced relation in the annealing and cooling zone, would each represent a large available body of heat which would tend to inhibit the development of strong regions of compression in the edge of the glass sheets supported on adjacent molds.

Another advantage which resulted from this improved method of operation was improved cross-car distortion as the result of the molds being relatively closely spaced and at a relatively higher temperature at the beginning of the next bending cycle than was the case prior to the present invention. "Cross car distortion" is the term used for optical aberrations visible when looking through a curved glass sheet at a small acute angle. The higher temperature and closer spacing of the molds has the effect of having the molds serve to provide more heat in the bending zone than was the case prior to the present invention, thus facilitating maintaining more easily controllable temperature conditions and requiring less thermal input during bending from heat sources in the bending zone than prior to the present invention.

Finally, the practice of the present invention resulted in an increase in production with fewer molds required for a complete complement of molds, for a mass production cycle, due to the increased speed of operation of the conveyor in the annealing and cooling zone. The increased speed, in turn, resulted from the requirement of the present invention to first increase the spacing between adjacent molds and then maintain said increased spacing during the annealing and cooling steps that the glass sheets undergo after they are shaped.

In the drawings forming part of this specification:

FIG. 1 is a schematic representation of a longitudinal section through a tunnel-type bending lehr for practicing the invention;

FIG. 2 is a cross-section through the tunnel-type bending lehr at the bending zone showing schematically the use of stub roll type conveyors, primary heaters and auxiliary heaters, and is indicated by the lines 2—2 of FIG. 1;

FIGS. 3 to 5 represent schematically the progress of the transfer of a mold from the relatively slower moving bending zone conveyor section across a set of idle rolls to the relatively faster moving annealing and cooling zone conveyor. The figures further show the relative spacing of the molds along the bending zone conveyor section and the annealing and cooling zone conveyor section.

Referring now in detail to the drawings and in particular FIGS. 1 and 2 thereof, a tunnel-type bending lehr 10 is an elongated substantially rectangular structure suitably supported and constructed of refractory materials. The lehr 10 is divided by a suitable partition 11, formed by suspending strips of flexible heat-resistant material such as fiberglass or asbestos, into a bending zone 12 and an annealing and cooling zone 14. The bending zone 12 and/or the annealing and cooling zone 14 may, if desired, be sub-divided into further distinct zones (not shown) for the purpose of isolating the ambient conditions within said sub-divided zones.

Both the bending zone 12 and the annealing and cooling zone 14 are suitably provided with a plurality of primary heating devices 16 which may be of any well-known type construction. Preferably, the primary heating devices 16 are of the electric resistance type with groups of said devices being disposed along the length of the lehr 10 and each device being independently controllable by known electrical control means (not shown) as to the amount of heat generated. Additionally, auxiliary heaters 17 of a known construction, such as those disclosed in U.S. Patent No. 2,794,300, issued on June 4, 1957, to James S. Golightly, may be provided in the bending zone 12 to provide especially intense localized heat as required. These auxiliary heaters are generally referred to in the bending art as crease heaters.

The individual molds 30 and their supporting structure or carriages indicated generally at 32, may be of any conventional design suitable for being transported along a continuous conveyor. In a specific embodiment of this invention, there is employed a bending mold 30 of the commonly used sectionalized, outline construction which supports one or more glass sheets 28 to be bent adjacent the marginal portion thereof. The mold 30 is securely mounted upon a mold carriage 32 as shown in FIG. 2.

Each carriage 32 is provided with a pair of skids 33 extending laterally at each longitudinal extremity thereof. Since the mold skids 33 are of the free running type i.e., not connected integrally to the conveyor, the relative spacing of the molds upon entering the lehr may be readily changed at will.

The conveyor of the specific embodiment of the present invention is of the stub roll type as indicated at 34 in FIG. 2. However, it must be recognized that belt conveyors and full-running roll-type conveyors or the equivalents may be equally adapted to be used in the practice of this invention.

The conveyor is indicated generally at 18 and is of the continuous type. The conveyor is adapted to be divided into separate sections, wherein all of the conveyor rolls within a given section are suitably linked together so that each roll in a section operates in precisely the same manner as all other rolls of that section. Additionally, separate variable speed drive means (not shown) are provided for each power driven conveyor section.

In the practice of the present invention, the continuous conveyor 18 is divided into a bending zone conveyor 20 and an annealing and cooling zone conveyor 22 with idle conveyor rolls, i.e., not power driven, 24 forming an intermediate conveyor section 25 therebetween. The length of the intermediate conveyor section 25 is less than the length of the skids 33. The annealing and cooling zone conveyor is, by virtue of its separate variable speed drive means (not shown) capable of being driven at a speed different from that at which the bending zone conveyor operates.

As an alternative for the idle conveyor rolls 24, the intermediate conveyor section 25 may be driven by the drive for either conveyor 20 or that of conveyor 22. Any well-known overrunning clutch arrangement may be employed to couple the intermediate conveyor section 25 to either conveyor section 20 or 22 to effect the transfer of a mold from the bending zone to the annealing and cooling zone as rapidly as possible.

The mode of operation of the above apparatus whereby improved stress characteristics were imparted to the marginal edge of bent glass sheets will now be described in detail.

Flat glass sheets having a total nominal thickness of ¼ inch and about 30 inches by 72 inches and weighing approximately 40 pounds per pair were mounted in pairs on stainless steel molds weighing about 80 pounds. The glass laden molds were introduced sequentially into a heated lehr. The successive molds were carried upon the lehr conveyor through the bending zone in a closely spaced relation, about 6 inches of spacing therebetween. The speed of the conveyor and the spacing of the molds in the bending zone was determined by trial and error with a view towards establishing an optimum bending cycle to accomplish complete bending of the glass within the limitations of the bending zone length and the heating means operating therewithin. For the particular apparatus used, this bending zone speed was 20.5 inches per minute.

The molds were then sequentially transported across idle rolls and onto the lehr conveyor section operating in the annealing and cooling zone. The spacing between molds upon entering the annealing and cooling zone was increased to 36 inches between molds. This increased spacing was accomplished in the particular embodiment of the present invention by operating the annealing and cooling section of the lehr conveyor at a constant speed of 40 inches per minute.

The spacing between adjacent rolls was 12 inches, the length of the skids 36 inches and the length of the intermediate section which included a single pair of idle stub rolls was about 24 inches.

The idle rolls disposed between the said conveyor sections assisted in effecting the speed change of the molds (and consequent increased spacing thereof in the annealing and cooling zone) by preventing skewing or misalignment of the molds relative to the conveyor. The idle rolls had the effect of decreasing the frictional resistance to speed change which can cause skewing of the molds if the resultant of the component forces acting on the molds is at an angle to the direction in which the molds are being transported by the conveyor. At the end of the annealing and cooling zone the bent glass was removed from the mold and the mold was returned to the bending zone for use in a subsequent cycle of operation.

The following data are representative of the improved stress characteristics obtained by the practice of this novel process upon increasing the relative spacing between successive wrap-around windshield molds in the annealing and cooling zone.

|  | Dr | Top $C_L$ | Pass | Dr | Bot $C_L$ | Pass |
|---|---|---|---|---|---|---|
| Before corrections | 534C<br>115T | 175C<br>50T | 230C<br>65T | 115C<br>70T | 5C<br>65T | 10C<br>70T |
| After corrections | 520C<br>110T | 610C<br>90T | 510C<br>100T | 410C<br>80T | 200C<br>80T | 180C<br>90T |

The data was taken by use of a polarized light source and quartz wedge as described in detail above. The measurements were made by the observer assuming the position of one sitting within an automobile wherein the "Dr" readings represent the highest strain reading on the section of the windshield in the normal view of the driver; "Pass" represents the highest strain reading on the section of the windshield in the normal view of the front seat passenger; $C_L$ represents the most critical reading on the line dividing the above two sections of the windshield; and Top and Bot represent the edges of the windshield which, in normal installation, are adjacent the roof and the hood, respectively, of an automobile. C indicates a measure of compressive strain and T indicates a measure of tensile strain, both in millimicrons per glass thickness. "Before Correction" readings were taken on sheets bent on molds which were uniformly spaced throughout the bending and the annealing and cooling zones. "After Correction" readings were taken on sheets bent as above but which were spaced further apart in the annealing and cooling zone than in the bending zone, as a result of increasing the runout speed through the former zone.

It will be observed by a comparison of the "After Correction" readings to the "Before Correction" readings that there was obtained, by virtue of the novel process employed, a substantial increase in the compressive stress along the longitudinal side portions of the peripheral edge of the glass sheet. It will also be noted that while there is generally a corresponding increase in tensile stress "after correction," the increase in tensile stress is nevertheless effectively maintained within a permissible range. It is normally considered desirable, in the production of bent, laminated windshields, to have a stress measurement corresponding to a strain of more than 200 millimicrons per glass thickness in compression along the marginal edge and corresponding to a strain of less than 100 millimicrons per glass thickness in tension adjacent said marginal edge. This marginal stress configuration produces a strong edge that resists chipping or breaking during handling and installation.

In producing another windshield pattern of modified rectangular configuration weighing 30 pounds and having a straight bottom edge 59 inches long, an upper edge 57 inches long, of shallow concave curvature and varying in width from 24 inches at the ends to 22 inches at the center, a mold weighing 54 pounds was used. A lehr 8 feet wide and 34 inches high having a preheat zone 39 feet long, three bending zones 10 feet long each and an annealing zone 20 feet long followed by a further cooling zone 100 feet long was energized by electrical heating elements radiating heat downward to provide 338 kilowatts in the preheating zone and 124, 135 and 179 kilowatts in the three successive bending zones. Mold carriages 36 inches wide were passed through the preheating and bending zones at a separation of 6 inches at a speed of 52 inches per minute. Upon removal from the mold bending zone, the glass sheets had conformed to the mold shaping surface and the molds were accelerated to a speed of 105 inches per minute to increase the separation between molds to about 4 feet. The molds traversed the annealing and cooling zone at said increased separation. No heat was added to the latter zone.

The more rapid movement of the molds through the annealing and cooling zone provided by the present invention reduced the time it took for the molds to return to the entrance of the bending zone. Therefore, the present invention caused less cooling of the molds between successive passes through the lehr than in the prior art. With the conveyor operating at high speed throughout the annealing and cooling zone to obtain and maintain molds separated therein, the molds had a higher temperature when loaded with glass sheets for successive bending operations than was obtained using slower conveyor speed. The molds in the bending zone thus provided a greater reservoir of heat to help raise the temperature of the glass toward its deformation temperature (upwards of 1080 degrees Fahrenheit for plate, sheet or float glass of conventional soda-lime-silica composition) in the early stages of the bending cycle. The close spacing between molds (only 6 inch separation) enabled the heat reservoir of each mold in the bending zone to affect the rate of heating of both its supported glass sheet and also those supported by adjacent molds, especially the longitudinal side edges of the transversely moving glass sheets.

In the annealing and cooling zone, the relatively wide separation between molds of 36 inches minimized the effect of the molds to retard the cooling rate of the glass sheets supported on adjacent molds, particularly their longitudinal side edges, as the glass sheets cooled through the annealing range of glass (approximately 1040 to 950 degrees Fahrenheit for soda-lime-silica plate, sheet or float glass) while traversing the portion of the controlled temperature atmosphere where the glass cooled through its annealing range. Thus, the present invention provides a sequence of steps by which the glass sheets are affected by the mass of the closely adjacent, heated molds while the glass sheets are heated for bending and wherein their cooling rates are not affected by neighboring molds as they cool through the annealing zone after the sheets are bent.

Although the present invention has been described with respect to specific details of certain embodiments thereof, it is not intended that such details serve as limitations upon the scope of the invention except insofar as set forth in the accompanying claims.

What is claimed is:

1. A method of bending glass sheets to conform to the shape of a plurality of outline molds wherein glass sheets are supported on a succession of molds for bending and sequentially transported through a hot atmosphere having a temperature higher than the annealing range of glass and capable of softening the glass sheets into conformity with upper shaping surfaces formed on said molds and wherein the glass sheets are subsequently annealed by controlled cooling in a controlled temperature atmosphere cooler than said atmosphere, said cooler atmosphere including a region having a temperature gradient of successively cooler temperatures extending through the annealing range of glass, the improvement comprising conveying said glass laden molds through said hot atmosphere until the glass sheets supported on said molds conform to their upper shaping surfaces at a separation between adjacent molds while traversing said hot atmosphere such that a body of heat developed by each mold is radiated toward adjacent glass laden molds in said atmosphere to affect the temperature of the glass sheets supported on the molds adjacent thereto, and to enhance a more uniform rate of heating said successive molds and said glass sheets supported thereon while the latter are transported through said hot atmosphere, and then conveying said glass laden molds through said controlled temperature atmosphere including said region whose temperature extends through the annealing range of glass and separating said successive molds in said hot atmosphere at a distance between molds sufficient to minimize the effect of the body of heat in each mold on the cooling rates of the glass sheets supported on the molds adjacent thereto, whereby an improved stress pattern is imparted to the longitudinal side portions of the bent, annealed glass sheets.

2. The method according to claim 1, further comprising the steps of returning each mold rapidly to said hot atmosphere for loading after it traverses said controlled temperature atmosphere to minimize cooling of the molds between successive passes through said hot atmosphere, and then conveying said successive glass laden molds through said hot atmosphere in relatively closely spaced relation to one another, said increased body of heat retained by said closely spaced molds reducing the amount of heat needed to be imparted to said hot atmosphere to sag said glass sheets, whereby improved cross car distortion is obtained in the bent, annealed glass sheets.

3. The method according to claim 1, wherein said increased spacing between said molds in said controlled temperature atmosphere is obtained by the steps of continuously conveying the glass laden molds at a fixed speed through said hot atmosphere, successively increasing the speed of each of said molds to a second speed as they sequentially enter the controlled temperature atmosphere thereby increasing the separation between successive molds upon entering said controlled temperature atmosphere, and continuously conveying said molds through the controlled temperature atmosphere at said second speed to maintain said increased separation therebetween as the glass sheets traverse the region maintained at successively cooler temperatures extending through the annealing range of glass.

4. In the art of bending and annealing glass sheets comprising supporting a plurality of glass laden molds in a tunnel-like bending furnace and conveying said glass laden molds through an annealing lehr disposed in end-to-end relation to said furnace along a continuous conveyor extending through said annealing lehr to transport a succession of said molds therethrough, heating each of a succession of glass sheets which are supported on said molds in said bending furnace to a temperature above the annealing range of glass and sufficient to raise the temperature of the glass to its deformation point so that it sags into conformity with an upper shaping surface of said glass laden mold, controlling the temperature within a portion of said annealing lehr to provide successively cooler temperatures along a portion of said annealing lehr that extend through the annealing range of glass, and supporting said molds at a relatively close spacing in said bending furnace such that each mold serves as a heat source that affects the temperature of a glass sheet supported on an adjacent mold, and then separating and conveying the molds through the annealing lehr at a greater separation between successive molds than existed in the bending furnace.

References Cited by the Examiner
UNITED STATES PATENTS 2,646,647   7/1953   Bamford et al. ------ 65—104 X
3,002,321   10/1961  Dunipace et al. ------ 65—119

DONALL H. SYLVESTER, Primary Examiner.

A. D. KELLOGG, Assistant Examiner.